(12) United States Patent
Dumitrescu et al.

(10) Patent No.: US 7,169,729 B2
(45) Date of Patent: Jan. 30, 2007

(54) USE OF ZINC DERIVATIVES AS CYCLIC ESTER POLYMERIZATION CATALYSTS

(75) Inventors: Anca Dumitrescu, Toulouse (FR); Martin-Vaca Blanca, Toulouse (FR); Heinz Gornitzka, Pompertuzat (FR); Didier Bourissou, Plaisance du Touch (FR); Jean-Bernard Cazaux, Aramon (FR); Guy Bertrand, Riverside, CA (US)

(73) Assignees: Societe de Conseils de Recherches et d'Applications Scientifiques (S.C.R.A.S.), Paris (FR); Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 10/474,617

(22) PCT Filed: Apr. 9, 2002

(86) PCT No.: PCT/FR02/01220

§ 371 (c)(1),
(2), (4) Date: Nov. 3, 2003

(87) PCT Pub. No.: WO02/083761

PCT Pub. Date: Oct. 24, 2002

(65) Prior Publication Data

US 2004/0110912 A1 Jun. 10, 2004

(30) Foreign Application Priority Data

Apr. 10, 2001 (EP) .................................. 01400926

(51) Int. Cl.
*C08F 4/06* (2006.01)
(52) U.S. Cl. ...................... 502/155; 502/152; 502/167; 502/200; 526/126; 526/135; 526/172; 526/320
(58) Field of Classification Search ................ 502/150, 502/152, 155, 167, 200; 526/204, 217, 266, 526/270, 273, 126, 135, 172, 320
See application file for complete search history.

(56) References Cited

U.S. PATENT DOCUMENTS 5,344,948 A * 9/1994 Verkade ........................ 556/51
6,281,154 B1 * 8/2001 Bertrand et al. ............. 502/150
6,303,807 B1 * 10/2001 Bertrand et al. .............. 556/81
6,716,787 B1 * 4/2004 Dumitrescu et al. ........ 502/155
6,790,972 B1 * 9/2004 Nguyen Ngoc et al. ...... 556/12

FOREIGN PATENT DOCUMENTS

| EP | 0890575 | | 1/1999 |
|---|---|---|---|
| WO | WO9902536 | * | 1/1999 |
| WO | WO200100628 A1 | * | 1/2001 |

OTHER PUBLICATIONS

H.Burger et al J. Organometal. Chem (1965), 3, 113.*
P.P.Power et al Inorg. Chem. (1991) No. 26, 5013-5015.*
H.Schumann et al , Z. Anorg. Allg. Chem (1997), 623, 1881.*

* cited by examiner

*Primary Examiner*—Helen L. Pezzuto
(74) *Attorney, Agent, or Firm*—Charles A. Muserlian

(57) ABSTRACT

The invention concerns the use of zinc derivatives of general formula (I) wherein: $L_1$ represents a group of formula: $-E_{14}(R_{14})(R'_{14})(R''_{14})$, $-E_{15}(R_{15})(R'_{15})$ or $-E_{16}(R_{16})$; E is an atom of group 15; $L_2$ and $L_3$ independently represent a group of formula: $-E_{14}(R_{14})(R'_{14})(R''_{14})$, $-E_{15}(R_{15})(R'_{15})$ or $-E_{16}(R_{16})$, or together form a chain of formula $-L'_2-A-L'_3-$; A represents a saturated or unsaturated chain comprising one, two or three elements of group 14; $L'_2$ and $L'_3$ independently represent a group of formula $-E_{14}(R_{14})(R'_{14})$ $-E_{15}(R_{15})$ or $-E_{16}-$; $E_{14}$ is an element of group 14; $E_{15}$ is an element of group 15; $E_{16}$ is an element of group 16; $R_{14}$, $R'_{14}$, $R''_{14}$, $R_{15}$, $R'_{15}$ and $R_{16}$ represent various groups, as (co) polymerisation catalysts of cyclic esters (1)

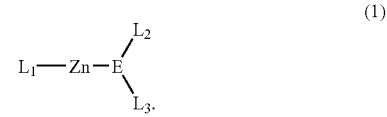

8 Claims, No Drawings

USE OF ZINC DERIVATIVES AS CYCLIC ESTER POLYMERIZATION CATALYSTS

This application is a 371 of PCT/FR02/01220 filed Apr. 9, 2002.

Over the last twenty years, biodegradable polymers have undergone considerable development. In particular, polyesters such as poly-ε-caprolactones, polylactides and polyglycolides are well adapted for a number of industrial (packaging, products for domestic use etc.), pharmaceutical (controlled- and sustained-release systems) and medical (suture elements, prostheses etc.) applications. They are generally prepared by polymerization by ring opening using metal derivatives, in particular of aluminium, tin and zinc (Kuran Prog. Polym. Sci. 1998, 23, 919). These polymerizations are most often carried out in a heterogeneous medium and lead to fairly wide mass distributions.

Of all the polyesters, the copolymers appear as "tailor-made" macromolecules. Depending on the uses sought, their properties can in fact be adjusted by acting on different parameters (chain length and mass distribution but also the nature, proportion and chain formation of the monomers and also the nature of the chain ends). There is therefore a need for new homogeneous phase polymerization processes making it possible to control all of these parameters.

In this field, during the last few years, work has been directed chiefly towards new more or less sophisticated catalytic systems such as porphyrin ligand systems [Inoue Acc Chem Res (1996) 29, 39], diamido-amine [Bertrand J Am Chem Soc (1996) 118, 5822; Organometallics (1998) 17, 3599] or also β-diiminate [Coates J Am Chem Soc (1999) 121, 11583; Polym. Prep. (1999) 40, 542].

The present invention proposes a cyclic ester (co)polymerization process which is both simple and effective, having a number of advantages, in particular:

- the zinc-based (co)polymerization catalysts used are easily accessible and inexpensive; they are not toxic or only slightly toxic. These are well defined compounds (they exist in monomer and/or dimer form);
- the (co)polymerization can in fact be carried out in a homogeneous medium in order that the mass distribution of the (co)polymers obtained is restricted; such a process is highly suitable for the preparation of block copolymers. The successive addition of monomers makes it possible in particular to obtain block copolymers. Finally the process makes it possible to completely control the nature of the ends of the (co)polymers.

A subject of the present invention is therefore the use of zinc derivatives of general formula (1)

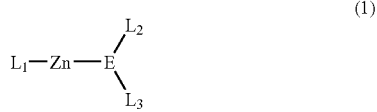

(1)

in which
L$_1$ represents a group of formula —E$_{14}$(R$_{14}$)(R'$_{14}$)(R"$_{14}$), —E$_{15}$(R$_{15}$)(R'or —E$_{16}$(R$_{16}$);
E is an atom of group 15;
L$_2$ and L$_3$ represent, independently, a group of formula —E$_{14}$(R$_{14}$)(R'$_{14}$)(R"$_{14}$), —E$_{15}$(R$_{15}$)(R'$_{15}$) or —E$_{16}$(R$_{16}$), or form together a chain of formula —L'$_2$—A—L'$_3$—;
A represents a saturated or unsaturated chain comprising one, two or three elements of group 14, each being optionally and independently substituted by one of the following substituted (by one or more identical or different substituents) or non-substituted radicals: alkyl, cycloalkyl, aryl, in which said substituent is a halogen atom, the alkyl, aryl, nitro or cyano radical;
L'$_2$ and L'$_3$ represent, independently, a group of formula —E$_{14}$(R$_{14}$)(R'$_{14}$)—, —E$_{15}$(R$_{15}$)— or —E$_{16}$—;
E$_{14}$ is an element of group 14;
E$_{15}$ is an element of group 15;
E$_{16}$ is an element of group 16;
R$_{14}$, R'$_{14}$, R"$_{14}$, R$_{15}$, R'$_{15}$ and R$_{16}$ represent, independently, the hydrogen atom; one of the following substituted (by one or more identical or different substituents) or non-substituted radicals: alkyl, cycloalkyl or aryl, in which said substituent is a halogen atom, the alkyl, cycloalkyl, aryl, nitro or cyano radical; a radical of formula —E'$_{14}$RR'R";
E'$_{14}$ is an element of group 14;
R, R' and R" represent, independently, the hydrogen atom or one of the following substituted (by one or more identical or different substituents) or non-substituted radicals: alkyl, cycloalkyl, aryl, in which said substituent is a halogen atom, the alkyl, aryl, nitro or cyano radical;

as cyclic ester (co)polymerization catalysts.

In the definitions indicated above, the expression halogen represents a fluorine, chlorine, bromine or iodine, preferably chlorine atom. The expression alkyl preferably represents a linear or branched alkyl radical having 1 to 6 carbon atoms and in particular an alkyl radical having 1 to 4 carbon atoms such as the methyl, ethyl, propyl, isopropyl, butyl, isobutyl, sec-butyl and tert-butyl radicals.

The cycloalkyl radicals are chosen from the saturated or unsaturated monocyclic cycloalkyls. The saturated monocyclic cycloalkyl radicals can be chosen from the radicals having 3 to 7 carbon atoms such as the cyclopropyl, cyclobutyl, cyclopentyl, cyclohexyl or cycloheptyl radicals. The unsaturated cycloalkyl radicals can be chosen from the cyclobutene, cyclopentene, cyclohexene, cyclopentadiene, cyclohexadiene radicals.

The aryl radicals can be of mono- or polycyclic type. The monocyclic aryl radicals can be chosen from the phenyl radicals optionally substituted by one or more alkyl radicals such as tolyl, xylyl, mesityl, cumenyl. The polycyclic aryl radicals can be chosen from the naphthyl, anthryl, phenanthryl radicals.

The compounds of formula (1) can be presented in cyclic monomer and/or dimer form:

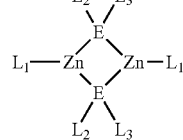 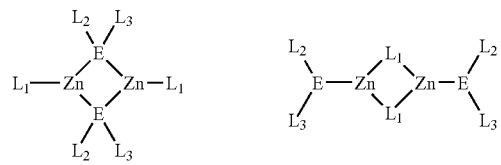

The compounds of formula (1) can comprise one or more solvent molecules [zinc complexes with one or two tetrahydrofuran molecules have been isolated and fully characterized: K. G. Caulton et al., Inorg. Chem. (1986) 25, 1803; D. J. Darensbourg et al., J. Am. Chem. Soc. (1999) 121, 107] or alternatively one or more phosphines [zinc complexes with one or two phosphine molecules have been isolated and fully characterized: D. J. Darensbourg et al., Inorg. Chem. (1998) 37, 2852 and ibid. (2000) 39, 1578]. The expression solvent represents an aromatic hydrocarbon such as benzene, toluene; a cyclic or acyclic dialkyl ether such as diethylether, dioxane, tetrahydrofuran, ethyltertiobutylether; a chlorinated solvent such as dichloromethane, chloroform; an aliphatic or aromatic nitrile such as acetonitrile, benzonitrile; an aliphatic or aromatic, cyclic or acyclic ketone such as acetone, acetophenone, cyclohexanone; an aliphatic or aromatic, cyclic or acyclic carboxylic acid derivative such as ethyl acetate, dimethylformamide. The expression phosphine represents an aromatic and/or aliphatic tertiary phosphine such as triphenylphosphine, diphenylmethylphosphine, dimethylphenylphosphine, tributylphosphine, trimethylphosphine.

A more particular subject of the invention is the use, as cyclic ester (co)polymerization catalysts, of the compounds of general formula (1) as defined above, characterized in that E is a nitrogen or phosphorus atom;
$E_{14}$ is a carbon or silicon atom;
$E_{15}$ is a nitrogen or phosphorus atom;
$E_{16}$ is an oxygen or sulphur atom;
A represents a saturated or unsaturated chain comprising one, two or three elements of group 14, each being optionally and independently substituted by an alkyl or aryl radical;
$R_{14}$, $R'_{14}$, $R''_{14}$, $R_{15}$, $R'_{15}$ and $R_{16}$ represent, independently, the hydrogen atom, an alkyl radical, an aryl radical or a radical of formula —$E'_{14}RR'R''$;
$E'_{14}$ is a carbon or silicon atom;
R, R' and R" represent, independently, the hydrogen atom or an alkyl radical, and preferably, E is a nitrogen atom;
$E_{14}$ is a carbon atom;
$E_{15}$ is a nitrogen atom;
$E_{16}$ is an oxygen or sulphur atom;
$R_{14}$, $R'_{14}$, $R''_{14}$, $R_{15}$ and $R'_{15}$ represent independently an alkyl radical or radical of formula —$E'_{14}RR'R''$;
$R_{16}$ represents an alkyl or aryl radical optionally substituted by one or more substituents chosen from the alkyl radicals and halogen;
$E'_{14}$ represents a silicon atom;
R, R' and R" represent, independently, the hydrogen atom or a methyl, ethyl, propyl or isopropyl radical.

A more particular subject of the invention is also the use, as cyclic ester (co)polymerization catalysts, of the compounds of general formula (1) as defined above, characterized in that $L_1$ represents a group of formula —$E_{15}(R_{15})(R'_{15})$;
$L_2$ and $L_3$ represent, independently, a group of formula —$E_{14}(R_{14})(R'_{14})(R''_{14})$; and preferably E is a nitrogen atom;
$E_{15}$ is a nitrogen atom;
$R_{14}$, $R'_{14}$, $R''_{14}$, $R_{15}$ and $R'_{15}$ represent independently an alkyl radical or radical of formula —$E'_{14}RR'R''$;
R, R' and R" represent, independently, an optionally substituted alkyl radical.

Very preferentially, the compound of formula (1) as defined above, corresponds to the following formula: $[(Me_3Si)_2N]_2Zn$.

Certain of the compounds of formula (1) are known products, i.e. the synthesis and the characterization of which have been described [H. Burger, W. Sawodny, U. Wannagat, J. Organometal. Chem. (1965) 3, 113; K. Hedberg et al., Inorg Chem. (1984) 23, 1972; P. P. Power et al., Inorg. Chem. (1991) 30, 5013; H. Schumann et al., Z. Anorg. Allg. Chem. (1997) 623, 1881 and ibid. (2000) 626, 747]. As a result, the new compounds of formula (1) can be prepared by analogy with the synthesis routes already described.

The invention relates to the use of the products of formula (1) as defined above, as catalysts for the implementation of cyclic ester (co)polymerization, i.e. polymerization or copolymerization of cyclic esters. During the implementation of these (co)polymerizations, the compounds according to the invention play the role of chain initiator and/or regulator.

The cyclic esters can range in size from four to eight members. As an example of cyclic esters corresponding to the above formulation, ε-caprolactone and the cyclic ester polymers of lactic and/or glycolic acid can be mentioned. Random or block copolymers can be obtained, depending on whether the monomers are introduced together at the start of the reaction, or sequentially during the reaction.

A subject of the invention is also a process for preparing random or block polymers or copolymers, which consists of bringing together one or more monomers, a chain initiator, a polymerization catalyst, and optionally an additive, said process characterized in that the chain initiator and the polymerization catalyst are represented by the same compound which is chosen from the compounds of formula (1) as defined above.

The expression additive represents any protic reagent such as water, hydrogen sulphide, ammonia, an aliphatic or aromatic alcohol, an aliphatic or aromatic thiol, a primary or secondary, aliphatic or aromatic, cyclic or acyclic amine. This reagent is capable of exchanging one of the substituents of the product of formula (1), which makes it possible to control the nature of one of the chain ends.

The (co)polymerization can be carried out either in solution or in superfusion. When the (co)polymerization is carried out in solution, the reaction solvent can be the (or one of the) substrate(s) used in the catalytic reaction. Solvents which do not interfere with the catalytic reaction itself, are also suitable. As examples of such solvents, saturated or aromatic hydrocarbons, ethers, the aliphatic or aromatic halides can be mentioned.

The reactions are carried out at temperatures comprised between ambient temperature and approximately 250° C.; the temperature range comprised between 20 and 180° C. has proved most advantageous. The reaction times are comprised between a few minutes and 300 hours, and preferably between 5 minutes and 72 hours.

This (co)polymerization process is particularly suitable for obtaining cyclic ester (co)polymers, in particular the cyclic ester polymers of lactic and/or glycolic acid. The products obtained such as glycolic lactic copolymers are biodegradable, and are advantageously used as a support in sustained release therapeutic compositions.

The invention finally relates to polymers or copolymers which can be obtained by the implementation of a process as described above.

Unless otherwise specified, all the technical and scientific terms used in the present Application, have the same meaning as that usually understood by an ordinary specialist in the field to which the invention belongs. Similarly, all the publications, patent applications and all other references mentioned in the present Application, are incorporated by way of reference.

The following examples are presented in order to illustrate the above procedures and should in no event be considered as a limit to the scope of the invention.

EXAMPLE 1

Preparation of an Oligomer with Controlled Chain Ends (amido-alcohol) $H_2N\text{-}(D,L\text{-lactide})_n\text{-}H$ 0.2 g (0.52 mmol) of $[(Me_3Si)_2N]_2Zn$ and 10 ml of dichloromethane are introduced successively into a Schlenk tube equipped with a magnetic stirrer and purged under argon. 0.6 g (4.16 mmol) of D,L-lactide in solution in 30 ml of dichloromethane is added to the preceding solution. The reaction mixture is left under stirring at 40° C. for 20 hours. Proton NMR analysis of an aliquot shows that the conversion of the D,L-lactide is greater than 95%. 0.5 ml of methanol is added to the preceding solution and stirring is maintained for 10 minutes. Evaporation of the solvent followed by extraction with acetonitrile makes it possible to isolate the oligomer in the form of a white solid. The nature of the chain ends of this oligomer is determined by mass spectrometry (electrospray ionization, positive ion mode detection, sample dissolved in acetonitrile with a trace of ammonium hydroxide).

EXAMPLE 2

Preparation of an Oligomer with Controlled Chain Ends (ester-alcohol) $i\text{-PrO-}(D,L\text{-lactide})_n\text{-}H$ 0.2 g (0.52 mmol) of $[(Me_3Si)_2N]_2Zn$, 40 µl (0.52 mmol) of isopropanol and 10 ml of dichloromethane are introduced successively into a Schlenk tube equipped with a magnetic stirrer and purged under argon.. The reaction mixture is left under stirring at ambient temperature for 10 minutes. After the addition of 0.6 g (4.16 mmol) of D,L-lactide in solution in 20 ml of dichloromethane, the reaction medium is left under stirring at ambient temperature for 60 hours. Proton NMR analysis of an aliquot shows that the conversion of the D,L-lactide is greater than 95%. 0.5 ml of methanol is added to the preceding solution and stirring is maintained for 10 minutes. Evaporation of the solvent followed by extraction with acetonitrile makes it possible to isolate the oligomer in the form of a white paste. The nature of the chain ends of this oligomer is determined by proton NMR and by mass spectrometry (electrospray ionization, positive ion mode detection, sample dissolved in acetonitrile with a trace of ammonium hydroxide).

EXAMPLE 3

Preparation of an Oligomer with Controlled Chain Ends (ester-anhydride) $i\text{-PrO-}(D,L\text{-lactide})_n\text{-COCH}_3$ 0.2 g (0.52 mmol) of $[(Me_3Si)_2N]_2Zn$, 40 µl (0.52 mmol) of isopropanol and 10 ml of dichloromethane are introduced successively into a Schlenk tube equipped with a magnetic stirrer and purged under argon. The reaction mixture is left under stirring at ambient temperature for 10 minutes. After the addition of 0.6 g (4.16 mmol) of D,L-lactide in solution in 20 ml of dichloromethane, the reaction medium is left under stirring at ambient temperature for 24 hours. Proton NMR analysis of an aliquot shows that the conversion of the D,L-lactide is greater than 95%. 0.2 ml of acetic anhydride is added to the preceding solution and the stirring is maintained for 10 minutes. Evaporation of the solvent followed by extraction with acetonitrile makes it possible to isolate the oligomer in the form of a white paste. The nature of the chain ends of this oligomer is determined by proton NMR and by mass spectrometry (electrospray ionization, positive ion mode detection, sample dissolved in acetonitrile with a trace of ammonium hydroxide).

EXAMPLE 4

Preparation of a Random Copolymer (D,L-lactide/glycolide) of Mass 15,000 having a lactide/glycolide Composition close to 50/50

3.92 g (27.3 mmol) of D,L-lactide, 3.11 g (27.3 mmol) of glycolide, and 12 ml of mesitylene are introduced successively into a Schlenk tube equipped with a magnetic stirrer and purged under argon then, a solution of 0.07 g (0.18 mmol) of $[(Me_3Si)_2N]_2Zn$ in 1 ml of mesitylene is introduced at 180° C. The reaction mixture is left under stirring at 180° C. for 2 hours. Proton NMR analysis makes it possible to verify that the conversion is 94% for the lactide and 100% for the glycolide. The ratio of the signal integrals corresponding to the polylactide part (5.20 ppm) and polyglycolide part (4.85 ppm) makes it possible to evaluate the composition of the copolymer at 50% lactide and 50% glycolide. According to GPC analysis, using a calibration carried out from PS standards of masses 761 to 400,000, this copolymer is a mixture of macromolecules (Mw/Mn=1.98) of fairly low masses (Mw=15,000 Dalton).

EXAMPLE 5

Preparation of a Random Copolymer (D,L-lactide/glycolide) of Mass 35,000 having a lactide/glycolide Composition close to 50/50

7.84 g (54.6 mmol) of D,L-lactide, 6.22 g (54.6 mmol) of glycolide and 12 ml of mesitylene are successively into a Schlenk tube equipped with a magnetic stirrer and purged under argon then, a solution of 0.07 g (0.18 mmol) of $[(Me_3Si)_2N]_2Zn$ in 1 ml of mesitylene is introduced at 180° C. The reaction mixture is left under stirring at 180° C. for 2 hours. Proton NMR analysis makes it possible to verify that the conversion is 78% for the lactide and 100% for the glycolide. The ratio of the signal integrals corresponding to the polylactide part (5.20 ppm) and polyglycolide part (4.85 ppm) makes it possible to evaluate the composition of the copolymer at 47% lactide and 53% glycolide. According to GPC analysis, using a calibration carried out from PS standards of masses 761 to 400,000, this copolymer is a mixture of macromolecules (Mw/Mn=1.56) of fairly high masses (Mw=35,000 Dalton).

EXAMPLE 6

Preparation of a Random Copolymer (D,L-lactide/glycolide) of Masse 45,000 having a lactide/glycolide Composition close to 50/50

3.92 g (27.2 mmol) of D,L-lactide, 3.11 g (27.2 mmol) of glycolide and 13 ml of mesitylene are introduced successively into a Schlenk tube equipped with a magnetic stirrer and purged under argon. Then, a solution of 70 mg (0.18 mmol) of $[(Me_3Si)_2N]_2Zn$ and 14 µl (0.18 mmol) of isopropanol in 2 ml of mesitylene is added at 180° C. The reaction mixture is left under stirring at 180° C. for 2 hours. Proton NMR analysis makes it possible to verify that the conversion is 80% for the lactide and 100% for the glycolide. The ratio of the signal integrals corresponding to the polylactide part (5.20 ppm) and polyglycolide part (4.85 ppm) makes it possible to evaluate the composition of the copolymer at 44% lactide and 56% glycolide. According to GPC analysis, using a calibration carried out from PS standards of masses 761 to 400,000, this copolymer is a mixture of macromolecules (Mw/Mn=1.65) of fairly high masses (Mw=45,000 Dalton).

EXAMPLE 7

Preparation of a Block Copolymer (D,L-lactide/glycolide)

4.7 g (33.5 mmol) of D,L-lactide, and 15 ml of mesitylene are introduced successively into a Schlenk tube equipped with a magnetic stirrer and purged under argon. Then, a solution of 86 mg (0.22 mmol) of $[(Me_3Si)_2N]_2Zn$ and 17 µl (0.22 mmol) of isopropanol in 3 ml of mesitylene is added at 180° C. The reaction mixture is left under stirring at 180° C. for 2 hours. Proton NMR analysis makes it possible to verify that the conversion of the monomer is total. 0.5 g (4.5 mmol) of glycolide is added to the preceding solution, maintained under stirring at 180° C. The reaction mixture is left under stirring at 180° C. for 1 hour. Proton NMR analysis of an aliquot shows that the conversion of the lactide and of the glycolide is total and that a copolymer is formed. The ratio of the signal integrals corresponding to the polylactide part (5.20 ppm) and polyglycolide part (4.85 ppm) is 9/1. GPC analysis indicates that this copolymer is a mixture of macromolecules of low polydispersity index (Mw=20 400 Dalton, Mw/Mn=1.41).

What is claim is:

1. In the (co)polymerization of cyclic esters, the improvement comprising using as catalyst zinc derivatives of the formula

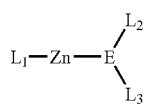

(1)

wherein $L_1$ is selected from the group consisting of —$E_{14}(R_{14})(R'_{14})(R''_{14})$,
—$E_{15}(R_{15})(R'_{15})$ and —$E_{16}(R_{16})$;
E is nitrogen or phosphorous;
$L_2$ and $L_3$ are, independently, selected from the group consisting of
—$E_{14}(R_{14})(R'_{14})(R''_{14})$, —$E_{15}(R_{15})(R'_{15})$ and —$E_{16}(R_{16})$,
$E_{14}$ is carbon or silicon;
$E_{15}$ is nitrogen or phosphorous;
$E_{16}$ is oxygen or sulfur;
$R_{14}$, $R'_{14}$, $R''_{14}$, $R_{15}$, $R'_{15}$ and $R_{16}$ are, independently, selected from the group consisting of hydrogen, alkyl, aryl and $E'_{14}RR'R''$;
$E'_{14}$ is carbon or silicon;
R, R' and R" are, independently, hydrogen or alkyl.

2. The polymerization process of claim 1 wherein
E is nitrogen;
$E_{14}$ is carbon;
$E_{15}$ is nitrogen;
$E_{16}$ is oxygen or sulfur;
$R_{14}$, $R'_{14}$, $R''_{14}$, $R_{15}$ and $R'_{15}$ are independently alkyl or —$E'_{14}RR'R''$;
$R_{16}$ is alkyl or aryl optionally substituted by at least one alkyl and halogen;
$E'_{14}$ is silicon;
R, R' and R" are, independently selected from the group consisting of hydrogen methyl, ethyl, propyl and isopropyl.

3. The polymerization process of claim 1 wherein
$L_1$ is —$E_{15}(R_{15})(R'_{15})$;
$L_2$ and $L_3$ are, independently, —$E_{14}(R_{14})(R'_{14})(R''_{14})$.

4. The polymerization process of claim 1 wherein
E is a nitrogen atom;
$E_{15}$ is a nitrogen;
$R_{14}$, $R'_{14}$, $R''_{14}$, $R_{15}$ and $R'_{15}$ are, independently, alkyl or —$E'_{14}RR'R''$;
R, R' and R" are, independently, optionally substituted alkyl.

5. In the polymerization of cyclic esters, the improvement of comprising using as the catalyst, $[(Me_3Si)_2N]_2Zn$.

6. The polymerization process of claim 1 wherein cyclic ester polymers are lactic and/or glycolic acid polymers.

7. In a process for the preparing block or random copolymers, or polymers, which consists of bringing together one or more monomers, a polymerization catalyst and, optionally, an additive, optionally a polymerization solvent, at a temperature between ambient temperature and 250° C. for a period of a few minutes and 300 hours, the improvement comprising using as the chain initiator and the polymerization catalyst a compound of (I) as defined in claim 1.

8. The process of claim 7 wherein the monomer is a cyclic ester polymer of lactic and/or glycolic acid.

* * * * *